Oct. 13, 1959 L. A. RUNTON ET AL 2,908,535
OILLESS ANTIFRICTION BEARINGS
Filed Oct. 24, 1957

INVENTORS
LESLIE A. RUNTON
HENRY C. MORTON.
BY
ATTORNEY

2,908,535

OILLESS ANTIFRICTION BEARINGS

Leslie A. Runton, Middle Haddam, and Henry C. Morton, Branford, Conn., assignors to The Russell Manufacturing Company, Middletown, Conn., a corporation of Connecticut Application October 24, 1957, Serial No. 692,118

2 Claims. (Cl. 308—163)

This invention relates to oilless, anti-friction bearings for light duty operations such as conveyor rollers or the like.

An object is to provide a molded fabric bearing disc which can conveniently be stamped in any desired size from a molded fabric sheet and in which anti-friction material is exposed on its inner and outer peripheries.

Another object is to provide a bearing of the above type which resists contamination by dirt or grit or by chemicals which may be encountered during use.

Other objects and advantages will be apparent as the nature of the invention is more fully disclosed.

The nature of the invention will be better understood from the following description, taken in connection with the accompanying drawing in which a specific embodiment has been set forth for purposes of illustration.

Figure 1:
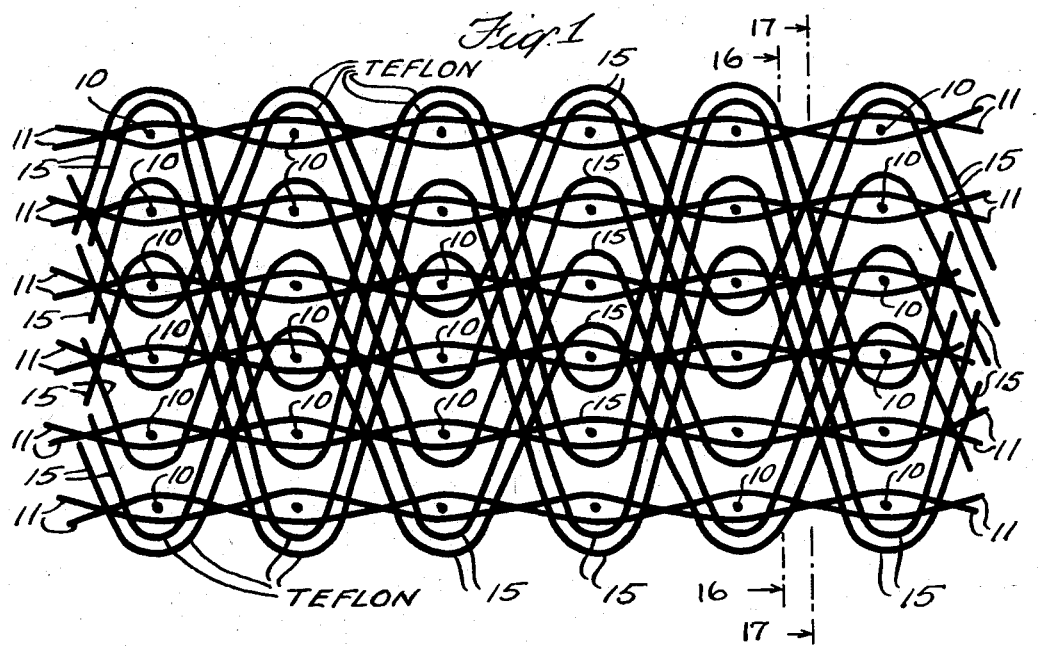
Fig. 1 is a diagrammatic view illustrating the weave of the fabric embodying the invention.

Referring to Fig. 1 the fabric is illustrated as having six plies of filler shots 10. The number of plies may vary according to the desired thickness of the fabric. The filler shots 10 of each ply are shown as bound by a pair of chain warps 11 to form a woven ply. The yarns 10 and 11 may be composed of materials which are capable of being bonded by an impregnant, for example cotton, Dacron, rayon, Orlon, by themselves, or twisted with continuous multifilament Teflon yarns.

The plies are bound together by binder warps 15 composed of multifilament Teflon (tetrafluoroethylene), or of cotton yarn twisted with multifilament Teflon. Teflon has a low coefficient of friction varying inversely with pressure, substantially no cold flow under pressure, and by itself is incapable of bonding to the usual impregnants. When twisted with cotton yarn as above, however, the resulting yarn is readily bondable.

The binder warps 15 extend through all of the plies and over the filler yarns 10 of the outer plies. Each binder 15 passes through the fabric in an inclined direction and advances by at least one filler shot at each passage. The binders of different dents are staggered in that a transverse cut through the fabric at any point, such as long lines 16 or 17 of Fig. 1, intersects and cuts through a plurality of such binders to leave exposed ends at the plane of cutting.

Figure 2:
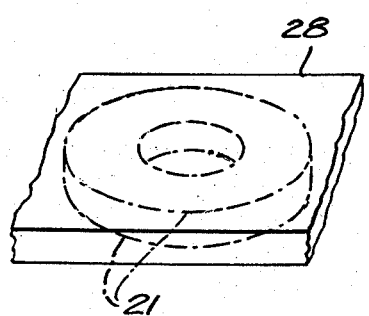
Fig. 2 is a perspective view of a molded fabric sheet from which the bearing discs are to be stamped.

The fabric may be impregnated with a high strength phenolic bonding resin derived from the reaction product of phenol, cresol or a homologue with formaldehyde under controlled conditions. The mixture is preheated to remove the solvent and the resin content polymerized until a residual volatile content of 5% to 7% is attained. The mixture is then molded under heat and pressure to the form of a flat sheet 28 as shown in Fig. 2. The conversion of the resin into a thermoset form may be accomplished at a temperature of 300° F. to 350° F. for from thirty to sixty minutes at pressures of 10 tons to 100 tons, depending upon the area of the object being molded.

Figure 3:
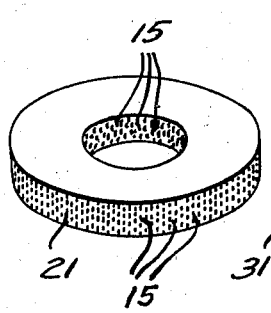
Fig. 3 is a perspective view of a bearing disc.

The molded fabric sheet 28 of Fig. 2 may be stamped or cut to form discs 21 of Fig. 3 having inner and outer peripheral bearing surfaces in which the Teflon yarns are exposed. These discs 21 may be stacked to form a bearing of the required thickness as illustrated in Fig. 4.

Figure 4:
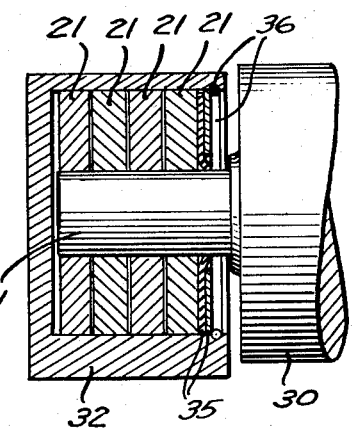
Fig. 4 is a detail view illustrating the bearing discs in use in connection with a roller shaft.

In Fig. 4 a roller 30 which may comprise a conveyor roll, is provided with a shaft 31 which is journaled in bearing disc 21 in a housing 32. The discs 21 are positioned on the shaft 31 by a metal washer 35 and seal held by a split ring 36.

The discs 21 are floating so that inner and outer peripheral bearing surfaces are provided, formed of the exposed ends of Teflon yarn which are renewed as the plastic wears away to expose additional ends. Such a bearing requires no lubrication and due to the low adhesion characteristics of the Teflon will not pick up or accumulate dirt or dust. Teflon is inert to most of the chemicals now in use and is not attacked or corroded thereby.

Sheet 28 may also be produced by incorporating a short flock, such as ½ mm. or 1½ mm. of Teflon flock in a molded resin such as polyvinylchloride, epoxy resins or phenolic resins.

In the case of a liquid such as polyvinylchloride the liquid may be placed in an open top mold the proper shape to form the sheet and the flock sprinkled over the surface of the liquid and worked into the liquid by combing or stirring. The mold may then be heated to the polymerizing temperature for polyvinylchloride, i.e. 350° F. to 360° F. and immediately cooled to set the resin to solid form with the Teflon flock embedded therein.

The epoxy resins are thermosetting and may be applied to the mold in the form of a molding powder. The Teflon flock is incorporated in the molding powder prior to curing. The mixture is cured by heating to the proper temperature to convert the resin into the form of a solid body in which the Teflon flock is embedded. The body may also be composed of a high strength phenolic bonding resin such as that above described. The Teflon flock is mixed with the resin molding powder in the desired proportion prior to setting. The mixture is then molded under heat and pressure as above described to form the sheet 28. The discs 21 may then be stamped from the sheet 28 as above described to form bearing rings with the Teflon flock exposed on the inner and outer surfaces.

A rubber base may also be used by mixing the Teflon flock with the natural or synthetic latex, drying and vulcanizing to cured form.

What is claimed is:

1. An oilless, antifriction bearing disc having an inner bearing peripheral surface and an outer peripheral surface, said disc comprising a woven fabric molded in a bonding resin, said fabric comprising a plurality of plies containing yarns capable of bonding to said resin bound together by yarns of tetrafluoroethylene, said tetrafluoroethylene binding yarns extending through said plies from outside surface to outside surface thereof whereby both the inner and outer peripheral surfaces have ends of tetrafluoroethylene yarn exposed from side edge to side edge of said peripheral surfaces.

2. A bearing comprising a plurality of stacked discs, each of said discs having an inner bearing peripheral surface and an outer peripheral surface, said disc comprising a woven fabric molded in a bonding resin, said fabric comprising a plurality of plies containing yarns capable of bonding to said resin bound together by yarns of tetrafluoroethylene, said tetrafluoroethylene binding yarns extending through said plies from outside surface to outside surface thereof whereby both the inner and outer peripheral surfaces have ends of tetrafluoroethylene yarn exposed from side edge to side edge of said peripheral surfaces.

References Cited in the file of this patent

UNITED STATES PATENTS

| | | |
|---|---|---|
| 2,597,975 | Colombo | May 27, 1952 |
| 2,599,857 | Mildner | June 10, 1952 |
| 2,600,353 | Wightman | June 10, 1952 |
| 2,716,579 | Stoak | Aug. 30, 1955 |
| 2,804,886 | White | Sept. 3, 1957 |
| 2,805,903 | Warren | Sept. 10, 1957 |

FOREIGN PATENTS

| | | |
|---|---|---|
| 730,655 | Great Britain | May 25, 1955 |